(12) United States Patent
He et al.

(10) Patent No.: US 11,379,059 B2
(45) Date of Patent: Jul. 5, 2022

(54) STYLUS, TOUCH PANEL, DISPLAY DEVICE AND TOUCH SENSING METHOD

(71) Applicants: Beijing BOE Display Technology Co., Ltd., Beijing (CN); BOE Technology Group Co., Ltd., Beijing (CN)

(72) Inventors: Jianzi He, Beijing (CN); Jianting Wang, Beijing (CN); Rui Guo, Beijing (CN); Zhiming Meng, Beijing (CN); Weibiao Geng, Beijing (CN); Junning Su, Beijing (CN)

(73) Assignees: Beijing BOE Display Technology Co., LTD., Beijing (CN); BOE Technology Group Co., LTD., Beijing (CN)

(*) Notice: Subject to any disclaimer, the term of this patent is extended or adjusted under 35 U.S.C. 154(b) by 0 days.

(21) Appl. No.: 17/256,242

(22) PCT Filed: Jan. 2, 2020

(86) PCT No.: PCT/CN2020/070111
§ 371 (c)(1),
(2) Date: Dec. 28, 2020

(87) PCT Pub. No.: WO2020/140947
PCT Pub. Date: Jul. 9, 2020

(65) Prior Publication Data
US 2021/0173497 A1    Jun. 10, 2021

(30) Foreign Application Priority Data

Jan. 2, 2019    (CN) .......................... 201910002792.9

(51) Int. Cl.
*G06F 3/0354* (2013.01)
*G06F 3/041* (2006.01)
*G06F 3/044* (2006.01)

(52) U.S. Cl.
CPC .......... *G06F 3/03545* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | |
|---|---|---|
| 2016/0098110 A1 | 4/2016 | Choi et al. |
| 2017/0068345 A1 | 3/2017 | Barel |

(Continued)

FOREIGN PATENT DOCUMENTS

| | | |
|---|---|---|
| CN | 105912147 A | 8/2016 |
| CN | 107357472 A | 11/2017 |

(Continued)

OTHER PUBLICATIONS

First office action of Chinese application No. 201910002792.9 dated Jan. 14, 2020.

(Continued)

*Primary Examiner* — Stephen T. Reed
(74) *Attorney, Agent, or Firm* — Fay Sharpe LLP

(57) ABSTRACT

A stylus (100), a touch panel (200), a display device and a touch sensing method are provided. The stylus (100) includes: a first emitting electrode (12); a second emitting electrode (13), wherein a distance between the first emitting electrode (12) and the second emitting electrode (13) in an extension direction of the stylus (100) is greater than zero; and an emitting circuit (11), which is connected to the first emitting electrode (12) and the second emitting electrode (13), respectively. The emitting circuit (11) is used to emit a first electrical signal outwards through the first emitting electrode (12) and to emit a second electrical signal outwards through the second emitting electrode (13), so that the touch panel (200) determines a tilt angle (A1) of the stylus (Continued)

(100) relative to the touch panel (200) according to the received first and second electrical signals.

18 Claims, 4 Drawing Sheets

(56) References Cited

U.S. PATENT DOCUMENTS

| | | | |
|---|---|---|---|
| 2017/0090658 A1* | 3/2017 | Park | G06F 3/03545 |
| 2017/0262071 A1 | 9/2017 | Chang et al. | |
| 2017/0308189 A1* | 10/2017 | Peretz | G06F 3/0383 |
| 2018/0095554 A1* | 4/2018 | Yeh | G06F 3/04162 |

FOREIGN PATENT DOCUMENTS

| | | |
|---|---|---|
| CN | 107390897 A | 11/2017 |
| CN | 107918500 A | 4/2018 |
| CN | 108027669 A | 5/2018 |
| CN | 109683733 A | 4/2019 |
| KR | 20140133274 A | 11/2014 |

OTHER PUBLICATIONS

Second office action of Chinese application No. 201910002792.9 dated Jul. 8, 2020.
Notification to grant patent right for invention of Chinese application No. 201910002792.9 dated Oct. 21, 2020.

* cited by examiner

STYLUS, TOUCH PANEL, DISPLAY DEVICE AND TOUCH SENSING METHOD

CROSS-REFERENCE TO RELATED APPLICATION

The present disclosure is a 371 of PCT Patent Application Serial No. PCT/CN2020/070111, filed on Jan. 2, 2020, which claims priority to Chinese Patent Application No. 201910002792.9, filed on Jan. 2, 2019 and titled "STYLUS, TOUCH PANEL, DISPLAY DEVICE AND TOUCH SENSING METHOD", the entire contents of which are incorporated herein by reference.

TECHNICAL FIELD

The present disclosure relates to the field of touch technology, and in particular, to a stylus, a touch panel, a display device and a touch sensing method.

BACKGROUND

With the popularization of smart phones and tablet computers, more and more applications need to enable high-precision touch with the aid of styluses, and the requirements for the performances of the styluses are increasingly high.

SUMMARY

The present disclosure provides a stylus, a touch panel, a display device and a touch sensing method.

In a first aspect, the present disclosure provides a stylus, which includes:

a first emitting electrode;

a second emitting electrode, wherein a distance between the first emitting electrode and the second emitting electrode in an extension direction of the stylus is greater than zero; and, an emitting circuit, which is connected to the first emitting electrode and the second emitting electrode, respectively, wherein the emitting circuit is used to emit a first electrical signal outwards through the first emitting electrode during a first period and to emit a second electrical signal outwards through the second emitting electrode during a second period, so that a touch panel obtains a tilt angle of the stylus relative to the touch panel according to the first electrical signal and the second electrical signal which are received by the touch panel;

Wherein, the first period and the second period are separated from each other, and the frequency of the first electrical signal is different from the frequency of the second electrical signal.

In a possible implementation, the stylus further includes:

a receiving electrode; and a detecting circuit, which is connected to the receiving electrode, wherein the detecting circuit is used to detect a frequency of a touch scanning signal of the touch panel through the receiving electrode;

wherein the detecting circuit is further connected to the emitting circuit, and the emitting circuit is further used to generate the first electrical signal according to the frequency of the touch scanning signal, so that a frequency of the first electrical signal is n times greater than the frequency of the touch scanning signal, n being a positive integer.

In a possible implementation, the stylus further includes:

a first wake-up circuit, which is connected to the detecting circuit, wherein the first wake-up circuit is used to wake up the emitting circuit when the detecting circuit detects the frequency of the touch scanning signal of the touch panel.

In a possible implementation, the stylus further includes:

a pressure sensor, which is connected to the receiving electrode, wherein the receiving electrode is at a tip of the stylus; and a second wake-up circuit, which is connected to the pressure sensor and the detecting circuit, respectively, wherein the second wake-up circuit is used to wake up the detecting circuit when the pressure sensor detects that the tip of the stylus is pressed.

In a possible implementation, the emitting circuit is further connected to the pressure sensor, and the emitting circuit is further used to generate the second electrical signal according to pressure information obtained by the pressure sensor, so that the second electrical signal includes the pressure information.

In a possible implementation, the stylus further includes a housing; the housing includes a tip through hole at the tip of the stylus; the receiving electrode includes a conductor rod with one end protruding from the tip through hole; and the first emitting electrode and the second emitting electrode each includes a conductor piece fitting an outer surface of the housing.

In a second aspect, the present disclosure further provides a touch panel, which includes:

a plurality of touch electrodes;

a receiving circuit, which is connected to each of the touch electrodes, wherein the receiving circuit is used to receive a first electrical signal and a second electrical signal from a stylus through the plurality of touch electrodes, wherein the first electrical signal and the second electrical signals are signals that are emitted outwards in different periods by the stylus through a first emitting electrode and a second emitting electrode, and a distance between the first emitting electrode and the second emitting electrode in an extension direction of the stylus is greater than zero;

a processing circuit, which is connected to the receiving circuit, wherein the processing circuit is used to detect emitting positions of the first and second electrical signals, and obtain a tilt angle of the stylus relative to the touch panel based on the emitting positions of the first and second electrical signals.

In a possible implementation, the receiving circuit includes:

a scanning sub-circuit, which is connected to at least one of the touch electrodes, wherein the scanning sub-circuit is used to provide a touch scanning signal to the connected touch electrode;

a sampling sub-circuit, which is connected to each of the touch electrodes, wherein the sampling sub-circuit is used to sample voltages of the plurality of touch electrodes; and a detecting sub-circuit, which is connected to the sampling sub-circuit and the processing circuit, respectively, wherein the detecting sub-circuit is used to send a message that the stylus is detected to the processing circuit when detecting the first electric signal, the frequency of which is n times greater than the frequency of the touch scanning signal, based on sampling data of the voltages of the plurality of touch electrodes, n being a positive integer.

In a possible implementation, a frequency at which the sampling sub-circuit samples the voltages of the plurality of touch electrodes is greater than the frequency of the first electrical signal.

In a possible implementation, the processing circuit is further used to calculate a touch position of the stylus by combining the tilt angle of the stylus and the emitting positions of the first and second electrical signals.

In a possible implementation, the receiving circuit receives the first electrical signal and the second electrical signal by oversampling.

In a possible implementation, the processing circuit is further used to extract pressure information under which the tip of the stylus is pressed, from the second electrical signal.

In a possible implementation, the processing circuit is further used to calculate a stylus-touch force level of the stylus by combining the tilt angle of the stylus and the pressure information.

In a third aspect, the present disclosure further provides a display device, which includes any one of the touch panels described above.

In a fourth aspect, the present disclosure further provides a touch sensing method applied to a touch panel including a plurality of touch electrodes, and the method includes:

receiving a first electrical signal and a second electrical signal from a stylus through the plurality of touch electrodes, wherein the first electrical signal and the second electrical signals are signals that are emitted outwards in different periods by the stylus through a first emitting electrode and a second emitting electrode, and a distance between the first emitting electrode and the second emitting electrode in an extension direction of the stylus is greater than zero;

detecting emitting positions of the first and second electrical signals; and obtaining a tilt angle of the stylus relative to the touch panel based on the emitting positions of the first and second electrical signals.

DETAILED DESCRIPTION

The embodiments of the present disclosure will be described in further detail with reference to the accompanying drawings, so as to present the principle and advantages of the present disclosure more clearly. It is apparent that the described embodiments are only a part of embodiments of the present disclosure, rather than all of the embodiments. According to the described embodiments of the present disclosure, all the other embodiments obtained by a person of ordinary skills in the art without making any creative efforts shall fall within the protection scope of the present disclosure. Unless otherwise defined, technical terms or scientific terms used in the present disclosure shall be taken to mean the ordinary meanings as understood by those of ordinary skills in the art to which the present disclosure belongs. The terms "first", "second", and the like used in the present disclosure do not denote any order, quantity, or importance, but are merely for the purpose of distinguishing different components. The terms "comprise" and the like are intended to mean that the elements or objects before said term cover the elements or objects or equivalents listed after said term, without excluding other elements or objects.

In the related art, an active capacitive stylus has become the most dominant type of stylus due to its advantages of high precision, low cost and high user experience. Unlike a passive capacitive stylus, the active capacitive stylus itself is a signal emission source. A sensor of a touch screen may receive a signal emitted by the active capacitive stylus to calculate its azimuth coordinates, thereby achieving an effect similar to that achieved by a handwriting pen writing on paper.

Figure 1:
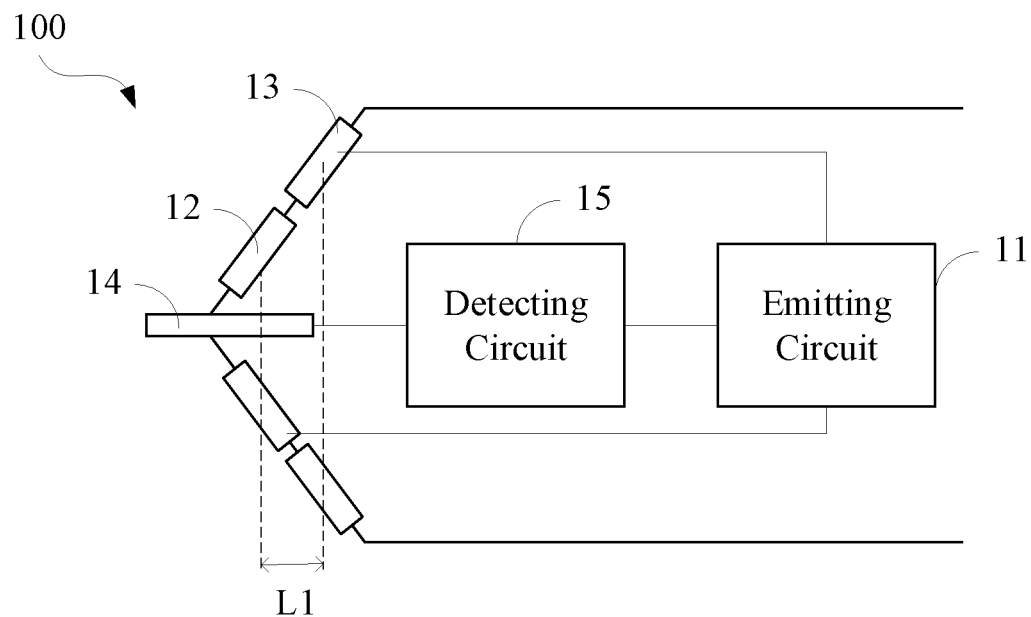
FIG. 1 is a schematic structural diagram of a stylus according to an embodiment of the present disclosure.

FIG. 1 is a schematic structural diagram of a stylus according to an embodiment of the present disclosure. Referring to FIG. 1, a stylus 100 includes an emitting circuit 11, a first emitting electrode 12, a second emitting electrode 13, a receiving electrode 14 and a detecting circuit 15. Wherein, the receiving electrode 14 is at a tip of the stylus 100, and a distance between the first emitting electrode 12 and the second emitting electrode 13 in an extension direction of the stylus 100 is a first length L1 (L1>0). It should be noted that, for convenience of description, the sizes of the first emitting electrode 12 and the second emitting electrode 13 are ignored when representing the first length L1 (that is, the first emitting electrode 12 and the second emitting electrode 13 are regarded as two geometric points in space). In addition, the emitting circuit 11 is connected to the first emitting electrode 12 and the second emitting electrode 13, respectively, and the detecting circuit 15 is connected to the receiving electrode 14 and the emitting circuit 11, respectively.

Figure 2:
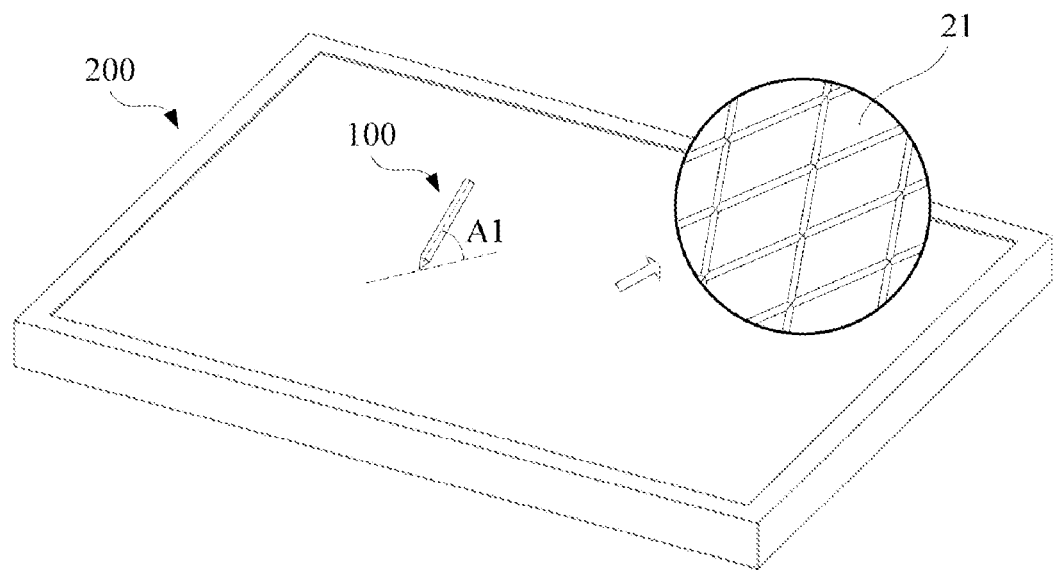
FIG. 2 is a schematic diagram showing a working principle of a stylus according to an embodiment of the present disclosure.

FIG. 2 is a schematic diagram showing the working principle of a stylus according to an embodiment of the present disclosure. Referring to FIG. 1 and FIG. 2, the emitting circuit 11 under an operating state is used to emit a first electrical signal outwards through the first emitting electrode 12 during a first period and to emit a second electrical signal outwards through the second emitting electrode 13 during a second period, so that a touch panel 200 may obtain a tilt angle A1 of the stylus 100 relative to the touch panel 200 according to the first electrical signal and the second electrical signal which are received by the touch panel. Wherein, the first period and the second period are separated from each other, and the frequency of the first electrical signal is different from the frequency of the second electrical signal. Illustratively, the first electrical signal and/or the second electrical signal may be emitted in a manner that the active capacitive stylus sends a touch signal to the touch screen.

Figure 3:
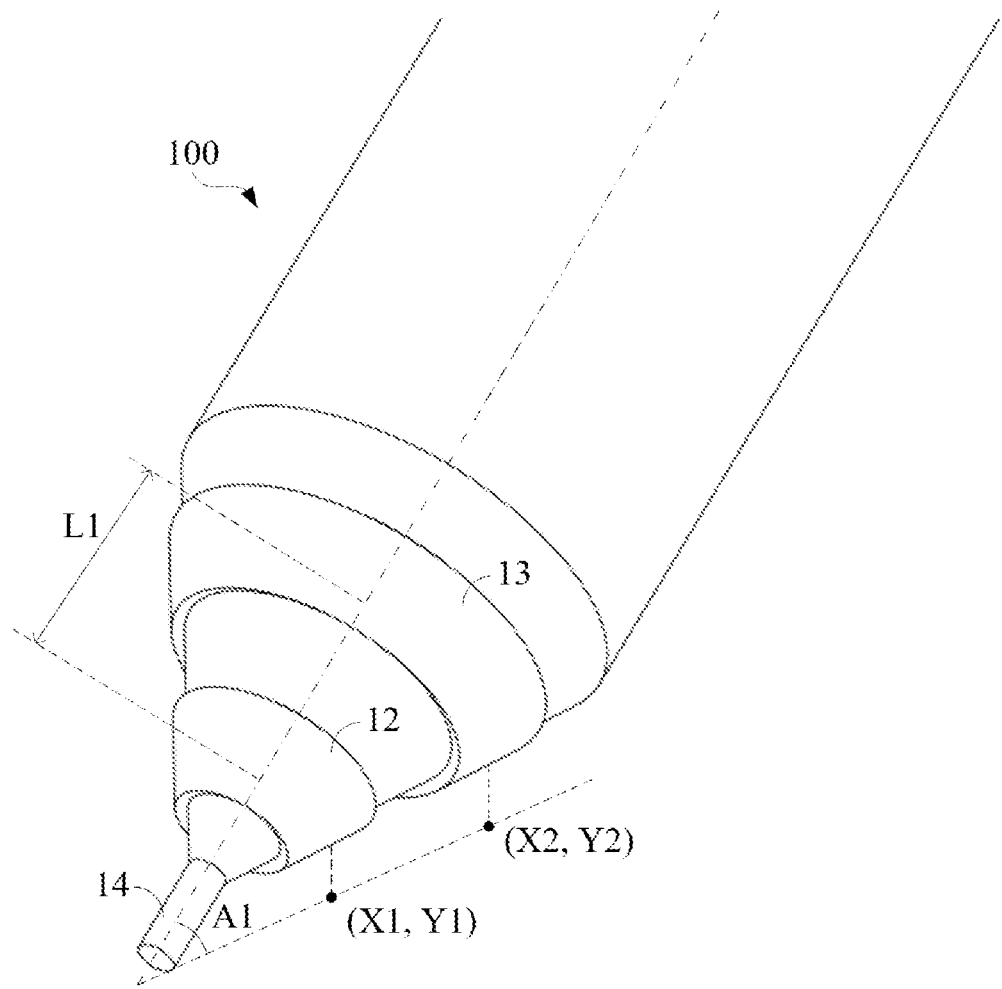
FIG. 3 is a schematic diagram showing a method for calculating a tilt angle of a stylus according to an embodiment of the present disclosure.

FIG. 3 is a schematic diagram showing a method for calculating a tilt angle of a stylus according to an embodiment of the present disclosure. Referring to FIG. 1, FIG. 2 and FIG. 3, in one example: the touch panel 200 may include several touch electrodes 21, and may receive the electrical signals emitted by the stylus 100 through the several touch electrodes 21, and accordingly obtain position coordinates of the touch electrodes 21, corresponding to emitting positions of the electrical signals, on a plane where the touch panel 200 is located. In this way, the touch panel 200 may receive the first electrical signal and the second electrical signal, respectively, and accordingly obtain the coordinates (X1, Y1) and (X2, Y2) of projection points of the first emitting electrode 12 and the second emitting electrode 13 on the plane where the touch panel 200 is located. It can be understood from FIG. 3 that as the tilt angle A1 decreases continuously from 90° to 0°, a distance between the coordinates (X1, Y1) and (X2, Y2) of the projection points increases continuously. Based on this, the magnitude of the tilt angle A1 corresponding to the value of the distance between the coordinates of the respective projection points can be obtained in advance and then configured in the touch panel 200, so that the touch panel 200 may obtain the tilt angle A1 of the stylus 100 relative to the touch panel 200 by respectively receiving the first electrical signal and the second electrical signal, and calculating the coordinates of the two projection points and the distance between the two coordinates.

It should be understood that although only one of the coordinates (X1, Y1) and (X2, Y2) of the projection points may be sufficient for the touch panel 200 to locate the approximate position of the tip of the stylus 100, the tilt angle A1 and the coordinates of the projection points (X1, Y1) and (X2, Y2), in contrast, obviously can more fully reflect the relationship between the stylus 100 and the touch panel 200 in a three-dimensional space, and this may allow the touch panel 200 to more accurately locate the position of the tip of the stylus 100. Therefore, the embodiments of the present disclosure can help improve the touch precision of the active capacitive stylus. In addition, the touch panel 200 may also use the obtained tilt angle A1 of the stylus 100 to reflect a change in a user gesture and a change in stroke during the writing by the user. Therefore, the embodiments of the present disclosure can help implement a variety of functions such as gesture recognition and stroke recognition for the stylus.

It should also be understood that the distance between the coordinates (X1, Y1) and (X2, Y2) of the projection points tends to continuously increases with the decrease of the tilt angle A1 only when the first length L1 above is more than zero. Therefore, when arranging the first emitting electrode 12 and the second emitting electrode 13 on the stylus 100, the distance from the two to the tip of the stylus 100 should be prevented from being the same. On the basis of satisfying this condition, the first emitting electrode 12 and the second emitting electrode 13 on the stylus 100 may be designed by comprehensively considering factors such as signal-to-noise ratio, signal interference and line arrangement in different application scenarios, and are not only limited to two conductor loops close to the tip of the stylus 100 as shown in the example above. Other optional forms are, for example, conductor pieces at the body of the stylus 100, or a conductor blocks hidden in an insulated housing, etc.

It should also be understood that, in order to obtain the tilt angle A1, the touch panel 200 may also need to acquire data related to a positional relationship between the first emitting electrode 12 and the second emitting electrode 13 on the stylus 100, in addition to locating projection positions corresponding to the first electrical signal and the second electrical signal. The data may be, for example, the magnitude of the tilt angle A1 which is pre-configured in the touch panel 200 and corresponds to a value of the distance between the coordinates of the respective projection points, and may also be, for example, other parameters (for example, the coordinates of the geometric centers of the first emitting electrode 12 and the second emitting electrode 13 in the three-dimensional coordinate system of the stylus 100), which are pre-configured in the touch panel 200 and with which the tilt angle A1 may be calculated using the coordinates of the projection points. In a further example, the data in any of the above forms may also be modulated into the first electrical signal and/or the second electrical signal, so that the touch panel 200 may demodulate the first electrical signal and/or the second electrical signal to obtain the data. In this way, the trouble of performing the above-mentioned pre-configuration in the touch panel 200 can be eliminated, and the touch panel 200 can also support a plurality of styluses 100 of different specifications at the same time. Of course, the touch panel 200 may also detect the tilt angle A1 without the above data. For example, the touch panel 200 may determine the tilt angle A1 of the stylus by tracking a change in the distance between a projection position of the first electrical signal and a projection position of the second electrical signal. In one example, the touch panel 200 records the first determined tilt angle A1 as 10.00 (a predetermined constant), and then calculate a change amount of the tilt angle A1 to calculate the changed tilt angle A1 on the basis of 10.00. For example, after the tilt angle A1 becomes 1.5 times greater than the original tilt angle A1, the changed tilt angle A1 can be calculated as 10.00×1.5=15.00; or after the tilt angle A1 changes by +3.00, the changed tilt angle A1 may be calculated as 10.00+3.00=13.00. At this time, the tilt angle A1 determined by the touch panel 200 any time after the first time is the degree of change from the tilt angle A1 determined for the first time.

Figure 4:
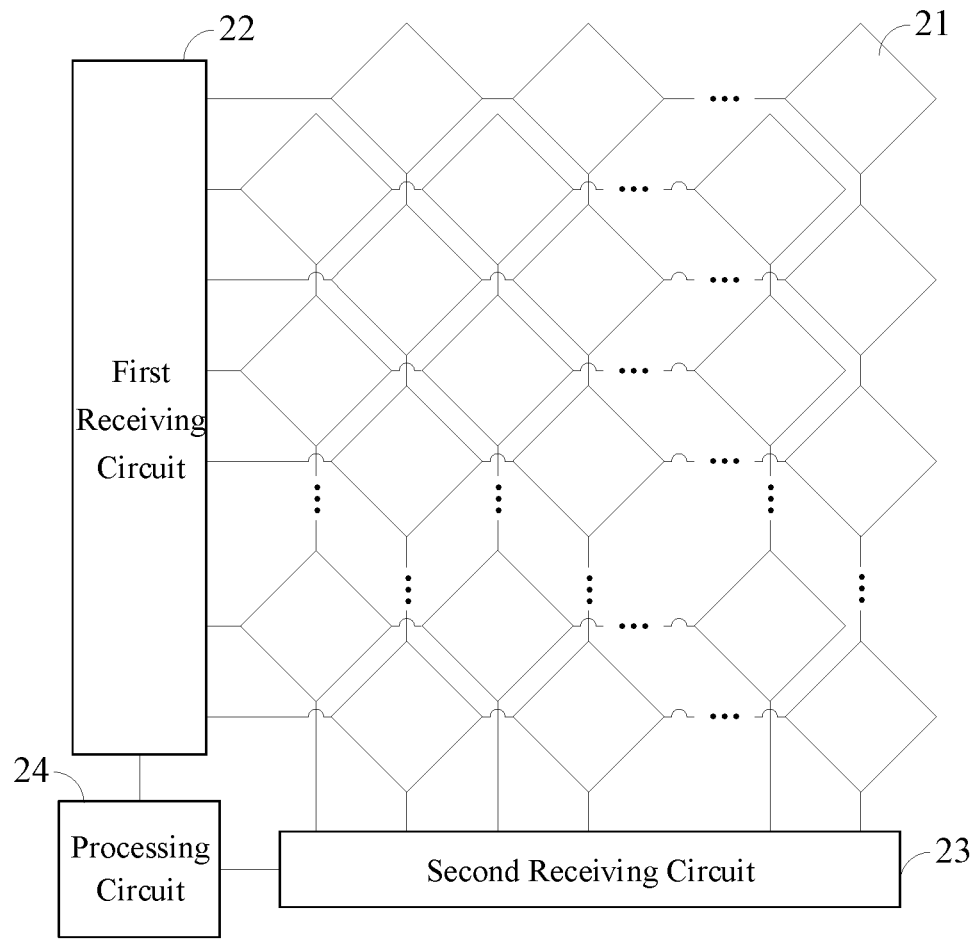
FIG. 4 is a schematic structural diagram of a touch panel according to an embodiment of the present disclosure.

FIG. 4 is a schematic structural diagram of a touch panel according to an embodiment of the present disclosure. Referring to FIG. 4, the touch panel 200 may include a first receiving circuit 22, a second receiving circuit 23, a processing circuit 24 and a plurality of touch electrodes 21. In this example, the plurality of touch electrodes 21 includes multiple rows of the first touch electrodes and multiple columns of the second touch electrodes. Each of the first touch electrodes or each of the second touch electrodes includes a plurality of diamond-shaped conductive patterns and conductor lines for connecting these diamond-shaped conductive patterns in series; each of the first touch electrodes is connected to the first receiving circuit 22; each of the second touch electrodes is connected to the second receiving circuit 23; and the processing circuit 24 is connected to the first receiving circuit 22 and the second receiving circuit 23, respectively. In this way, the processing circuit 24 may receive electrical signals from the multiple rows of first touch electrodes through the first receiving circuit 22 to determine the rows that have sensed a touch action, and may receive electrical signals from the multiple columns of second touch electrodes through the second receiving circuit 23 to determine the columns that have sensed a touch action, thereby enabling touch sensing.

It should be understood that the receiving circuit consisting of the first receiving circuit 22 and the second receiving circuit 23 is used to receive the first electrical signal and the second electrical signal from the stylus 100 through a plurality of touch electrodes; and the processing circuit 24 is used to detect the emitting positions of the first electrical signal and the second electrical signal, and obtain the tilt angle of the stylus relative to the touch panel based on the emitting positions of the first electrical signal and the second electrical signal. Wherein, the emitting positions may include, for example, the coordinates (X1, Y1) and (X2, Y2) of the above projection points; and in combination with the above data related to the positional relationship between the first emitting electrode 12 and the second emitting electrode 13 on the stylus 100, the processing circuit 24 may process the above tilt angle A1 obtained according to any of the above methods.

In one example, the processing circuit 24 provides a touch scanning signal with a certain frequency, as an excitation for receiving the electrical signals on the multiple columns of second touch electrodes, to the multiple rows of first touch electrodes through the first receiving circuit 22, then provides the touch scanning signal, as an excitation for receiving the electric signals on the multiple rows of first touch electrodes, to the multiple columns of second touch electrodes through the second receiving circuit 23, and repeats this process to enable touch sensing. The above detecting circuit 15 may be used to detect the frequency of the touch scanning signal of the touch panel 200 through the receiving electrode 14, and meanwhile, the transmitting circuit 11 may be used to generate the first electrical signal according to the frequency of the touch scanning signal, so that the frequency of the first electrical signal is n times higher than the frequency of the touch scanning signal, n being a positive integer. In this way, when receiving an electrical signal with a frequency n times higher than that of the touch scanning signal, the touch panel 200 may recognize it as an electrical signal emitted by the stylus 100, and thus may distinguish it from electrical signals from other sources, thereby helping to achieve the effect of being able to touch with a finger while using the stylus 100.

In another example, the functions of providing the touch scanning signal and detecting the frequency of the electrical signals may be implemented by the receiving circuit. For example, the receiving circuit may include: a scanning sub-circuit, which is connected to at least one of the touch electrodes and is used to provide a touch scanning signal to the connected touch electrode; a sampling sub-circuit, which is connected to each of the touch electrodes and is used to sample voltages of the plurality of touch electrodes; and a detecting sub-circuit, which is connected to the sampling sub-circuit and the processing circuit, respectively, and is used to send a message that the stylus 100 is detected to the processing circuit 24 when detecting the first electric signal, the frequency of which is n times greater than the frequency of the touch scanning signal, based on sampling data of the voltages of the plurality of touch electrodes 21, n being a positive integer. Of course, the receiving circuit and the processing circuit 24 may also perform the above functions based on labor-division cooperation.

In one example, the above sampling sub-circuit may sample the voltages of the plurality of touch electrodes 21 at a frequency greater than the frequency of the first electrical signal. For example, by oversampling, the electrical signals on the respective touch electrodes are digitally sampled respectively based on a high-frequency pulse signal, so as to help reduce interferences from stochastic noise. Before or after sampling, at least one of filtering, shaping, amplifying, and demodulating may also be performed on the first electrical signal or the second electrical signal according to application requirements.

In one example, the processing circuit 24 is also used to calculate the touch position of the stylus 100 by combining the tilt angle A1 of the stylus 100 and the emitting positions of the first and second electrical signals. As an example, referring to FIG. 3, the touch panel 200 is pre-configured with a scale factor X1 in one-to-one correspondence to each value of the tilt angle A1. The scale factor X1 is a ratio of a distance from a position of the touch position of the stylus 100 on a plane where the touch panel 200 is located to (X1, Y1) to a distance between (X1, Y1) and (X2, Y2). In this way, after obtaining the scale factor X1 by query, the processing circuit 24 may obtain the position coordinates of the touch position of the stylus 100 by locating it on an extension line connecting (X1, Y1) and (X2, Y2) through geometric calculation. It should be understood that the corresponding relationship between the above scale factor X1 and the tilt angle A1 may be measured for example by experimental calibration and/or theoretical calculation, and configured in the touch panel 200.

Figure 5:
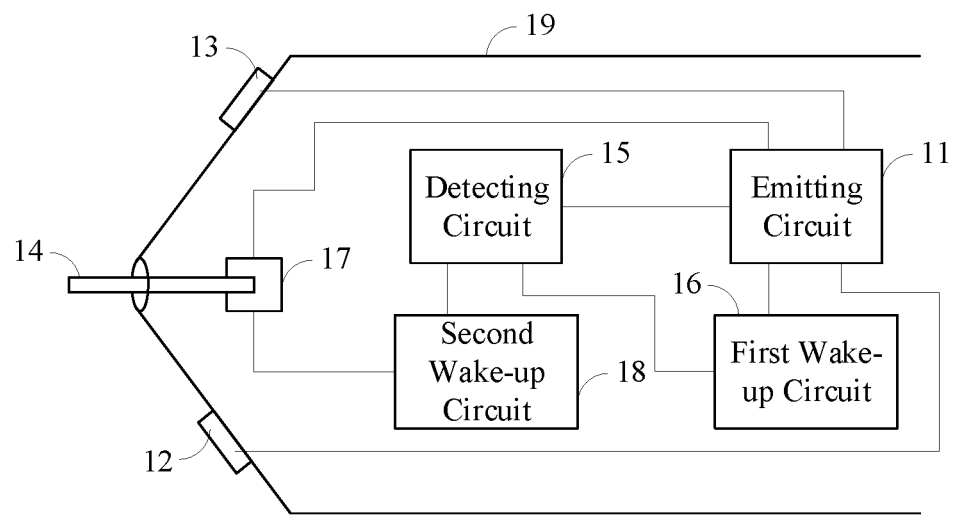
FIG. 5 is a schematic structural diagram of another stylus according to an embodiment of the present disclosure.

FIG. 5 is a schematic structural diagram of another stylus according to an embodiment of the present disclosure. Referring to FIG. 5, compared with the structure shown in FIG. 1, the stylus 100 shown in FIG. 5 further includes a first wake-up circuit 16, a pressure sensor 17, and a second wake-up circuit 18; and FIG. 5 shows a housing 19 of the stylus 100 and a tip through hole of the housing 19, wherein the tip through hole is at the tip of the stylus 100 to allow the receiving electrode 14 to protrude. Wherein, the pressure sensor 17 is connected to the receiving electrode 14, which is a conductor rod with one end protruding from the tip through hole; and the first emitting electrode 12 and the second emitting electrode 13 each include a conductor piece fitting the outer surface of the housing 19.

In one example, both the emitting circuit 14 and the detecting circuit 15 above may enter a sleep state when in an idle state. For example, when a state in which the pressure sensor 17 detects that the pressure on the tip of the stylus 100 is zero lasts for more than a preset time (such as 60 Seconds), the operation of switching the emitting circuit 14 and the detecting circuit 15 to the sleep state may be triggered thereby to save the power consumption of the stylus 100. In an example of a wake-up mode, the second wake-up circuit 18 connected to the pressure sensor 17 and the detecting circuit 15 respectively is used to wake up the detecting circuit 15 when the pressure sensor 17 detects that the tip of the stylus 100 is pressed, so that the detecting circuit 15 starts to detect the touch scanning signal of the touch panel 200 through the receiving electrode 14. The first wake-up circuit 16 connected to the detecting circuit 15 and the transmitting circuit 14 respectively is used to wake up the emitting circuit 14 when the detecting circuit 15 detects the frequency of the touch scanning signal of the touch panel 200, so that the emitting circuit 14 starts to emit the first and second electrical signals outwards based on the detected frequency of the touch scanning signal. Based on the above sleep mechanism, the stylus 100 may only retain a pressure sensing function in the idle state; and other parts may reduce power consumption through sleep, and may quickly return to the operating state through the above wake-up process when the user starts writing, thereby favorably reaching a balance between using effects and power losses.

In an example, the emitting circuit 14 is connected to the pressure sensor 17, and the emitting circuit 14 is further used to generate the second electrical signal according to the pressure information obtained by the pressure sensor 17, so that the second electrical signal includes the pressure information. For example, the emitting circuit 14 may allow the generated second electrical signal to carry the pressure information obtained by the pressure sensor 17 in an agreed signal modulation manner. Correspondingly, the processing circuit 24 in the touch panel 200 is further used to extract the pressure information under which the tip of the stylus is pressed, from the second electrical signal. For example, the pressure information may be extracted from the second electrical signal in a manner corresponding to the agreed signal modulation manner. In addition, the processing circuit 24 may be also used to calculate a stylus-touch force level of the stylus 100 by combining the tilt angle A1 of the stylus 100 and the pressure information. For example, when the pressure at the tip of the stylus 100 is the same, the smaller the tilt angle A1, the greater the stylus-touch force level of the stylus 100; and when the tilt angle A1 is the same, the greater the pressure at the tip of the stylus 100, the higher the stylus-touch force level of the stylus 100. Based on this, the stylus-touch force levels corresponding to combinations of respective pressure magnitude intervals and value intervals of the tilt angle A1 may be in turn pre-configured in the touch panel 200, thereby enabling touch force recognition when the user writes with the stylus 100 and helping implementing more relevant practical functions.

It should be noted that, in any of the above examples of the stylus 100, all the circuits other than the pressure sensor 17 may be implemented in hardware and/or software. In a software implementation example, the stylus 100 includes a microprocessor (MCU) and a power supply circuit. The microprocessor pre-stores code programs for implementing the functions of the above circuits. With the power supply of the power supply circuit, the microprocessor may implement the functions of the above circuits by executing these code programs. In a hardware implementation example, at least one of the circuits mentioned in the stylus 100 may be implemented in the form of a logic gate circuit. Similarly, in any of the above examples of the touch panel 200, the receiving circuit and the processing circuit 24 each may be implemented in hardware and/or software. It should be understood that when the first electrical signal and the second electrical signal are processed through software, the electrical signals may be collected faster at higher precision by virtue of the properties such as high signal-to-noise ratio and high processing speed of digital filtering and digital sampling; and the design of the power supply circuit may be simplified by using fewer voltages with lower values.

It should also be noted that, although "the first electrical signal and the second electrical signal have different frequencies" and "the first electrical signal and the second electrical signal have different emitting periods" are illustrated above as examples, the implementation of the present disclosure may not be limited to these. For example, different identification codes may be programmed into the first electrical signal and the second electrical signal, so that the touch panel 200 may distinguish the first electrical signal from the second electrical signal by recognizing the identification codes. Or, the emitting power of the first electrical signal may be significantly different from the emitting power of the second electrical signal, so that the touch panel 200 may distinguish the first electrical signal from the second electrical signal by detecting the power of the electrical signals. Of course, a reference may also be made to other methods in the related art that can distinguish the electrical signals to enable the distinguishing of the first electrical signal from the second electrical signal in the present disclosure, and the details are not repeated here.

Figure 6:
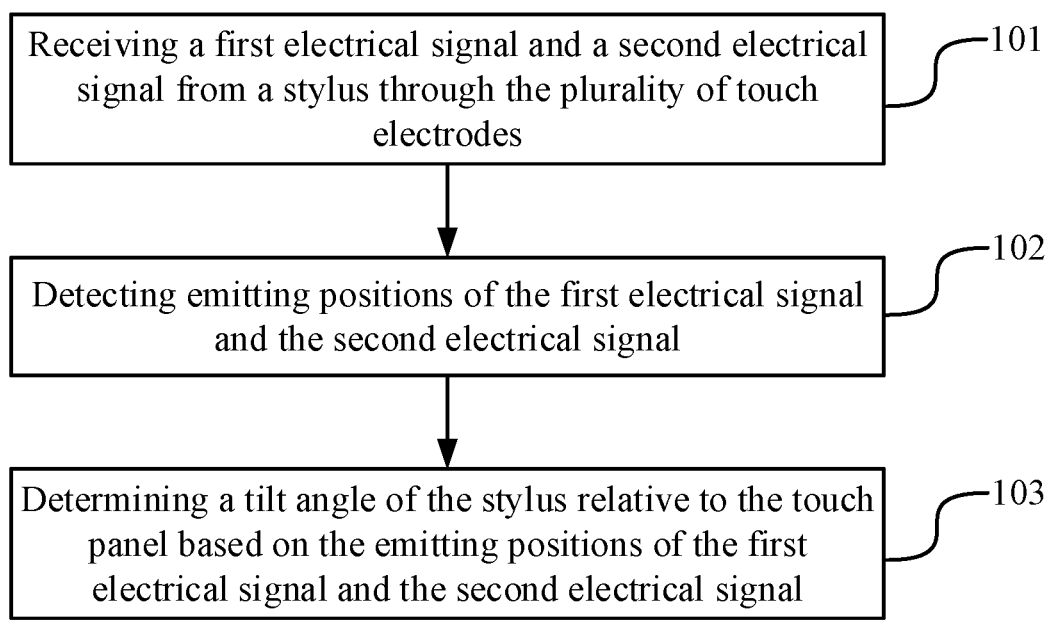
FIG. 6 is a schematic flowchart of a touch sensing method according to an embodiment of the present disclosure.

FIG. 6 is a schematic flowchart of a touch sensing method according to an embodiment of the present disclosure. Referring to FIG. 6, this method may be applied to any of the above touch panels 200 including a plurality of touch electrodes 21, and the method may include the following processes.

In step 101, a first electrical signal and a second electrical signal from a stylus are received through the plurality of touch electrodes.

Wherein, the first electrical signal and the second electrical signals are signals that are emitted outwards in different periods by the stylus through a first emitting electrode and a second emitting electrode, and a distance between the first emitting electrode and the second emitting electrode in an extension direction of the stylus is greater than zero.

In step 102, emitting positions of the first and second electrical signals are detected.

In step 103, a tilt angle of the stylus relative to the touch panel is obtained based on the emitting positions of the first and second electrical signals.

It can be understood that the working principle of any of the above touch panels 200 may be regarded as an implementation example of the above method. Therefore, the optional implementations of the corresponding steps can be understood according to the description above, and the details are not repeated here.

Based on the same concept of the present disclosure, an embodiment of the present disclosure provides a display device, which includes any one of the touch panels described above. In this embodiment of the present disclosure, the display device may be display panel, a mobile phone, a tablet computer, a television, a displayer, a notebook computer, a digital photo frame, a navigator, or any products or components that have a display function.

It can be understood that the stylus according to the embodiments of the present disclosure can emit different electrical signals respectively through the first emitting electrode and the second emitting electrode at different positions, so that the touch panel can locate the emitting positions of the two electrical signals on the stylus by detecting the two electrical signals, thereby obtaining a tilt angle of the stylus through calculation. Hence, the embodiments of the present disclosure can enable the touch panel to locate the position of the tip of the stylus more accurately, which can help improve the touch precision of the active capacitive stylus, and can help implement a variety of functions such as gesture recognition and stroke recognition for the stylus based on the recognition of the tilt angle of the stylus.

To the extent possible, the technical elements at different aspects as illustrated in the embodiments above can be combined with each other. Moreover, the above description merely provides preferred embodiments of the present disclosure, and is not intended to limit the present disclosure. Any modifications, equivalent substitutions, improvements and the like made within the spirit and principle of the present disclosure shall fall within the scope of the claims attached to the present disclosure.

What is claimed is:

1. A stylus, comprising:
   a first emitting electrode;
   a second emitting electrode, wherein a distance between the first emitting electrode and the second emitting electrode in an extension direction of the stylus is greater than zero; and
   an emitting circuit, which is connected to the first emitting electrode and the second emitting electrode, respectively, wherein the emitting circuit is used to emit a first electrical signal through the first emitting electrode and to emit a second electrical signal through the second emitting electrode, so that a touch panel determines a tilt angle of the stylus relative to the touch panel according to the first electrical signal and the second electrical signal which are received by the touch panel; and
   the stylus further comprises:
   a receiving electrode; and
   a detecting circuit, which is connected to the receiving electrode, wherein the detecting circuit is used to detect a frequency of a touch scanning signal of the touch panel through the receiving electrode;

wherein the detecting circuit is further connected to the emitting circuit, and the emitting circuit is further used to generate the first electrical signal according to the frequency of the touch scanning signal, so that a frequency of the first electrical signal is n times greater than the frequency of the touch scanning signal, n being a positive integer; and wherein the stylus further comprises a housing; the housing comprises a tip through hole at a tip of the stylus; the receiving electrode comprises a conductor rod with one end protruding from the tip through hole; and each of the first emitting electrode and the second emitting electrode comprises a conductor piece fitting an outer surface of the housing.

2. The stylus according to claim 1, further comprising:
a first wake-up circuit, which is connected to the detecting circuit, wherein the first wake-up circuit is used to wake up the emitting circuit when the detecting circuit detects the frequency of the touch scanning signal of the touch panel.

3. The stylus according to claim 1, further comprising:
a pressure sensor, which is connected to the receiving electrode, wherein the receiving electrode is at a tip of the stylus; and a second wake-up circuit, which is connected to the pressure sensor and the detecting circuit, respectively, wherein the second wake-up circuit is used to wake up the detecting circuit when the pressure sensor detects that the tip of the stylus is pressed.

4. The stylus according to claim 3, wherein the emitting circuit is further connected to the pressure sensor, and the emitting circuit is further used to generate the second electrical signal according to pressure information obtained by the pressure sensor, so that the second electrical signal comprises the pressure information.

5. The stylus according to claim 1, wherein the emitting circuit is specifically used to emit the first electrical signal outwards through the first emitting electrode during a first period, and to emit the second electrical signal outwards through the second emitting electrode during a second period; and wherein the first period and the second period are separated from each other, and the frequency of the first electrical signal is different from the frequency of the second electrical signal.

6. A touch panel, comprising:
a plurality of touch electrodes;
a receiving circuit, which is connected to each of the touch electrodes, wherein the receiving circuit is used to receive the first electrical signal and the second electrical signal from the stylus according to claim 1 through the plurality of touch electrodes; and
a processing circuit, which is connected to the receiving circuit, wherein the processing circuit is used to detect emitting positions of the first electrical signal and the second electrical signal, and to determine the tilt angle of the stylus relative to the touch panel based on the emitting positions of the first electrical signal and the second electrical signal; and
wherein the receiving circuit comprises a scanning sub-circuit, which is connected to at least one of the touch electrodes, wherein the scanning sub-circuit is used to provide a touch scanning signal to the touch electrode which is connected to the scanning sub-circuit.

7. The touch panel according to claim 6, wherein the receiving circuit comprises:
a sampling sub-circuit, which is connected to each of the touch electrodes, wherein the sampling sub-circuit is used to sample voltages of the plurality of touch electrodes; and
a detecting sub-circuit, which is connected to the sampling sub-circuit and the processing circuit, respectively, wherein the detecting sub-circuit is used to send a message of the stylus being detected to the processing circuit when detecting the first electric signal based on sampling data of the voltages of the plurality of touch electrodes, n being a positive integer.

8. The touch panel according to claim 7, wherein a frequency at which the sampling sub-circuit samples the voltages of the plurality of touch electrodes is greater than the frequency of the first electrical signal.

9. The touch panel according to claim 6, wherein the processing circuit is further used to determine a touch position of the stylus by combining the tilt angle of the stylus and the emitting positions of the first electrical signal and the second electrical signal.

10. The touch panel according to claim 6, wherein the receiving circuit receives the first electrical signal and the second electrical signal by oversampling.

11. The touch panel according to claim 6, wherein the processing circuit is further used to extract pressure information under which the tip of the stylus is pressed, from the second electrical signal information.

12. The touch panel according to claim 11, wherein the processing circuit is further used to determine a stylus-touch force level of the stylus by combining the tilt angle of the stylus and the pressure information.

13. A display device, comprising the touch panel according to claim 6.

14. A touch sensing method, wherein the method is applied to the touch panel according to claim 6, and the method comprises:
receiving the first electrical signal and the second electrical signal from the stylus through the plurality of touch electrodes, wherein the first electrical signal is a signal emitted by the stylus through the first emitting electrode, and the second electrical signal is a signal emitted by the stylus through the second emitting electrode;
detecting emitting positions of the first electrical signal and the second electrical signal; and
determining the tilt angle of the stylus relative to the touch panel based on the emitting positions of the first electrical signal and the second electrical signal.

15. A display device, comprising the touch panel according to claim 7.

16. A display device, comprising the touch panel according to claim 8.

17. A display device, comprising the touch panel according to claim 9.

18. A display device, comprising the touch panel according to claim 12.

* * * * *